(12) United States Patent  
Wakimoto

(10) Patent No.: US 8,624,515 B2  
(45) Date of Patent: Jan. 7, 2014

(54) FIXING DEVICE OF LIGHT-EMITTING BODY AND LIGHTING DEVICE

(75) Inventor: Kenichi Wakimoto, Hokkai-do (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 224 days.

(21) Appl. No.: 13/299,806

(22) Filed: Nov. 18, 2011

(65) Prior Publication Data

US 2012/0126725 A1    May 24, 2012

(30) Foreign Application Priority Data

Nov. 19, 2010    (JP) .................................. 2010-258861

(51) Int. Cl.
    *H05B 37/02*    (2006.01)

(52) U.S. Cl.
    USPC ...................................... 315/209 R; 315/210

(58) Field of Classification Search
    USPC ............................................. 315/209 R, 210
    See application file for complete search history.

(56) References Cited

U.S. PATENT DOCUMENTS

| | | | | |
|---|---|---|---|---|
| 5,738,954 | A | * | 4/1998 | Latella et al. .................... 429/97 |
| 5,848,541 | A | * | 12/1998 | Glick et al. .................... 70/278.3 |
| 5,962,962 | A | | 10/1999 | Fujita et al. |
| 6,114,958 | A | * | 9/2000 | Murphy ...................... 340/568.1 |
| 7,859,627 | B2 | | 12/2010 | Nishida et al. |
| 7,999,463 | B2 | | 8/2011 | Nomura |
| 2005/0258436 | A1 | | 11/2005 | Arai |
| 2008/0129184 | A1 | | 6/2008 | Nishida et al. |
| 2008/0129933 | A1 | | 6/2008 | Nishida et al. |
| 2008/0130122 | A1 | | 6/2008 | Egi et al. |
| 2009/0133360 | A1 | | 5/2009 | Rippin et al. |
| 2011/0089814 | A1 | | 4/2011 | Nomura |
| 2011/0089823 | A1 | | 4/2011 | Nomura |
| 2011/0101388 | A1 | | 5/2011 | Nomura |
| 2011/0134647 | A1 | | 6/2011 | Nishida et al. |
| 2011/0140617 | A1 | | 6/2011 | Nomura |

FOREIGN PATENT DOCUMENTS

| | | |
|---|---|---|
| JP | 2006-108651 | 4/2006 |
| JP | 2007-173424 | 7/2007 |
| JP | 2009-281117 | 12/2009 |
| JP | 2010-218897 | 9/2010 |
| WO | WO 2006/030719 A1 | 3/2006 |

OTHER PUBLICATIONS

Reineke, S. et al, "White Organic Light-Emitting Diodes with Fluorescent Tube Efficiency," Nature, vol. 459, May 14, 2009, pp. 234-239.

* cited by examiner

*Primary Examiner* — Don Le
(74) *Attorney, Agent, or Firm* — Husch Blackwell LLP

(57) ABSTRACT

A fixing device of a light-emitting body, whose mounting height is suppressed, is provided. Further, a lighting device whose mounting height is suppressed is provided. Further, a lighting device whose mounting height is suppressed and in which fixtures supporting a light-emitting body are hidden from view is provided. Furthermore, a lighting device whose mounting height is suppressed and in which light-emitting bodies can be arranged with no space therebetween and supported is provided. A structure is employed in which a planar light-emitting body whose thickness is suppressed is formed using an organic electroluminescent element, a terminal is provided in each of end portions facing each other in the planar light-emitting body, the terminals are made in contact with contacts provided in fixtures, and the end portions of the light-emitting body are held between the fixtures.

11 Claims, 6 Drawing Sheets

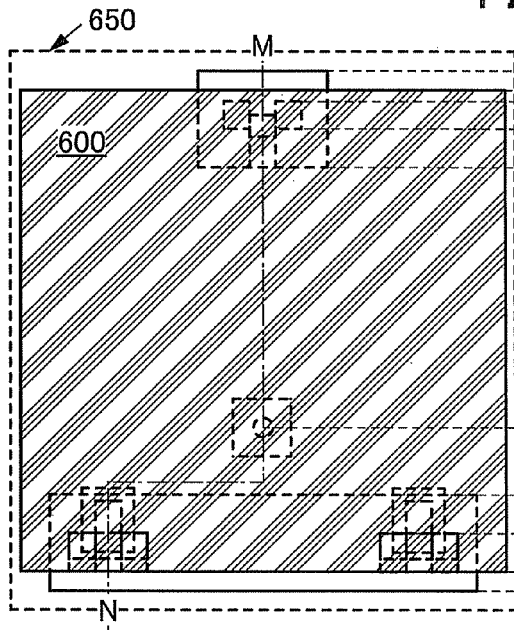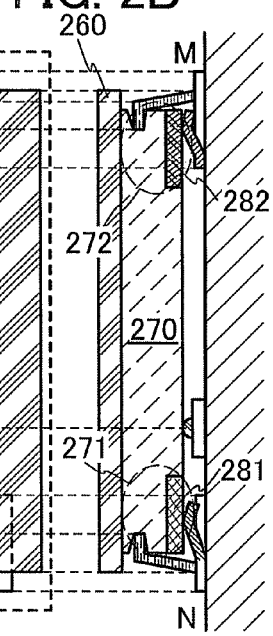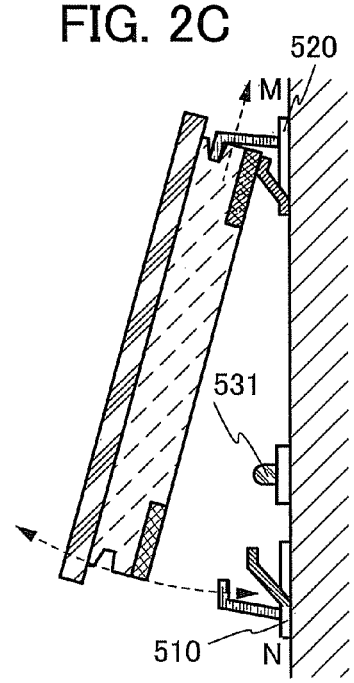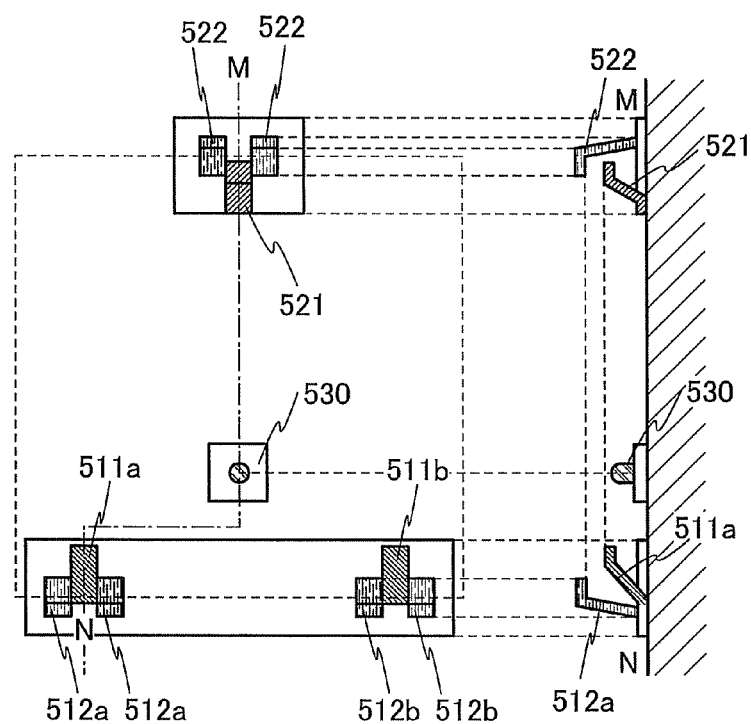

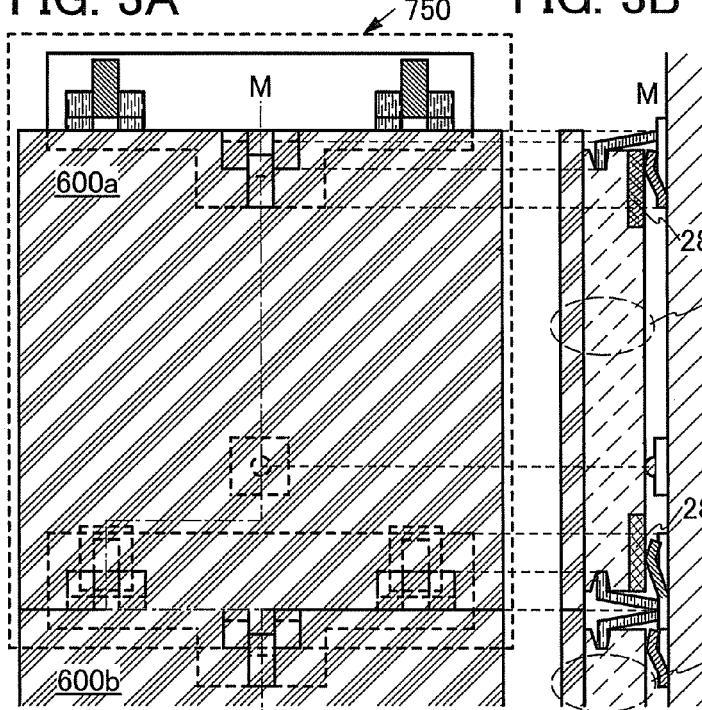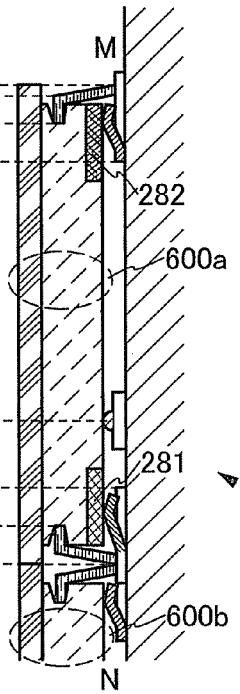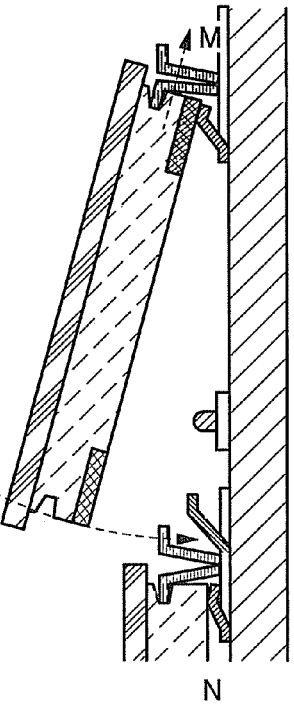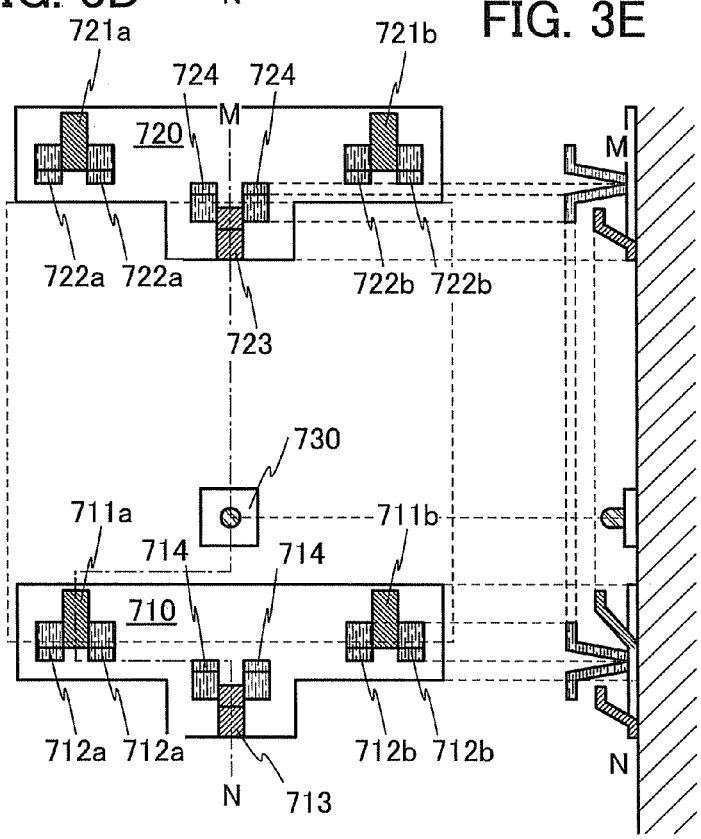

FIXING DEVICE OF LIGHT-EMITTING BODY AND LIGHTING DEVICE

BACKGROUND OF THE INVENTION

1. Field of the Invention

The present invention relates to a fixing device of a light-emitting body and a lighting device. In particular, the present invention relates to a fixing device fixing a planar light-emitting body and a lighting device including a planar light-emitting body.

2. Description of the Related Art

A planar light-emitting element which includes a first electrode, a second electrode overlapping with the first electrode, and a light-emitting layer between the first electrode and the second electrode, and in which light emitted from the light-emitting layer is extracted to the outside through the first electrode or the second electrode is known. A light-emitting element with such a structure has characteristics in that a light-emitting region is easily spreads on a plane and a plurality of light-emitting regions is easily arranged in a plane.

As an example of a light-emitting element with the above structure, a light-emitting element utilizing a phenomenon of electroluminescence can be given. Specifically, a light-emitting element including a planar light-emitting region with several tens of centimeters square having a thickness of several millimeters with a sealing structure can be manufactured.

An invention of Patent Document 1 discloses a lighting device. In the lighting device, a plurality of light-emitting elements, each including a light-emitting layer between a first electrode and a second electrode, is provided over a substrate; and a light-emitting body in which the light-emitting elements are connected in series is used.

REFERENCE

[Patent Document 1] Japanese Published Patent Application No. 2006-108651

SUMMARY OF THE INVENTION

In conventional light sources typified by incandescent lamps, fluorescent lamps, and the like, a light-emitting body itself is about several centimeters high since light is emitted from a space sealed with glass. Further, since a light source is shaped like a dot or a line, efforts have been made. For example, a diffusion plate is provided between a light-emitting body and a user, in order to reduce glare of the light source.

Owing to the above circumstances, a conventional lighting device tends to protrude from a mounting portion (e.g., a ceiling) at a height (or a thickness) of several centimeters to several tens of centimeters. When a protrusion of a lighting device needs to be reduced because of design or construction, a mounting portion is processed so that the lighting device is embedded in the mounting portion, resulting in complicated work and difficult construction. Note that in this specification, the height of a portion that protrudes from a mounting portion is referred to as "mounting height".

Further, a fluorescent lamp needs to include a terminal portion, a driver portion including an inverter and the like; however, since the fluorescent lamp is a line light source, it is difficult to cover the driver portion with the light source. Consequently, a housing needs to be provided in the terminal portion and the driver portion in order to improve the appearance, which leads to an increase in the number of components.

The present invention is made in view of such a technical background. Therefore, an object of one embodiment of the present invention is to provide a fixing device of a light-emitting body, whose mounting height is suppressed. Further, an object is to provide a lighting device whose mounting height is suppressed. Further, an object is to provide a lighting device whose mounting height is suppressed and in which fixtures supporting a light-emitting body are hidden from view. Furthermore, an object is to provide a lighting device whose mounting height is suppressed and in which light-emitting bodies can be arranged with no space therebetween and supported.

In order to achieve the above objects, attention is focused on an organic electroluminescent element (also referred to as an organic EL element) in the present invention.

Then, a structure is considered in which a planar light-emitting body whose thickness is suppressed is formed using an organic electroluminescent element, a terminal is provided in each of end portions facing each other in the planar light-emitting body, the terminals are made in contact with contacts provided in fixtures, and the end portions of the light-emitting body are held between the fixtures. With this structure, the above objects are achieved.

That is, one embodiment of the present invention is a fixing device of a light-emitting body, including a first fixture including a first contact, a second fixture including a second contact, a power supply circuit driving the light-emitting body, and a switch detecting that the light-emitting body is fixed. In addition, the first fixture and the second fixture are provided to face each other so that end portions of the light-emitting body are held therebetween, and the power supply circuit supplies power for driving the light-emitting body to the first contact and the second contact through the switch.

According to the above embodiment of the present invention, a lighting device whose mounting height is suppressed can be provided with a structure in which end portions of a light-emitting body are held between fixtures facing each other. The switch detects the light-emitting body held between the fixtures, and the power supply circuit can supply power to the first contact and the second contact; thus, a short circuit between the first contact and the second contact can be prevented in the state where the light-emitting body is not mounted.

Further, one embodiment of the present invention is a lighting device including a planar light-emitting body, a first fixture and a second fixture which have elasticity and are arranged to face each other, a power supply circuit driving the light-emitting body, and a switch. In addition, the light-emitting body includes an organic EL element, a first latch portion, and a second latch portion. The organic EL element includes a layer comprising an organic material with a light-emitting property between a first electrode and a second electrode. The first latch portion includes a first terminal electrically connected to the first electrode of the organic EL element. The second latch portion includes a second terminal electrically connected to the second electrode of the organic EL element. The first latch portion is latched to the first fixture so that the first terminal is electrically connected to a first contact provided in the first fixture, and the second latch portion is latched to the second fixture so that the second terminal is electrically connected to a second contact provided in the second fixture; thus, the light-emitting body supported by the first fixture and the second fixture is detected by the switch, and the power supply circuit can supply power to the first contact and the second contact.

According to the above embodiment of the present invention, the height of the planar light-emitting body is suppressed by using the organic EL element, the terminals of the light-emitting body are made in contact with the contacts provided in the fixtures, and the end portions of the light-emitting body are held between the fixtures. With such a structure, a lighting device whose mounting height is suppressed can be provided. The switch detects the light-emitting body held between the fixtures, and the power supply circuit can supply power to the first contact and the second contact; thus, a short circuit between the first contact and the second contact can be prevented in the state where the light-emitting body is not mounted.

Further, one embodiment of the present invention is the above-described lighting device including the first latch portion and the second latch portion in a back surface of the light-emitting body on a side where light is extracted; and in which the first fixture and the second fixture are provided to overlap with the light-emitting body.

According to the above embodiment of the present invention, the fixtures can be arranged in the back surface of the light-emitting body, so that a lighting device arranged adjacent to the light-emitting body does not interfere with the fixtures. Thus, a lighting device whose mounting height is suppressed and in which light-emitting bodies can be arranged with no space therebetween and supported can be provided.

Further, one embodiment of the present invention is the above-described lighting device including the first fixture and the second fixture with a distance which is the same as a distance between the first latch portion and the second latch portion.

According to the above embodiment of the present invention, a lighting device whose mounting height is suppressed and in which light-emitting bodies can be arranged with no space therebetween and supported can be provided. The first fixture and the second fixture are provided in advance with a distance which is the same as a distance between the first latch portion and the second latch portion in the lighting device, so that adjustments of a position where the first fixture is mounted and a position where the second fixture is mounted are unnecessary. Thus, a lighting device, which can be mounted in a simpler way, can be provided.

Furthermore, one embodiment of the present invention is a lighting device including a first planar light-emitting body, a first fixture and a second fixture, which have elasticity and are arranged to face each other, a power supply circuit driving the first light-emitting body, and a switch. The first light-emitting body includes an organic EL element, a first latch portion, and a second latch portion. The organic EL element includes a layer comprising an organic material with a light-emitting property between a first electrode and a second electrode. The first latch portion includes a first terminal electrically connected to the first electrode of the organic EL element. The second latch portion includes a second terminal electrically connected to the second electrode of the organic EL element. The first latch portion is latched to the first fixture so that the first terminal is electrically connected to a first contact provided in the first fixture, and the second latch portion is latched to the second fixture so that the second terminal is electrically connected to a second contact provided in the second fixture; thus, the first light-emitting body supported by the first fixture and the second fixture is detected by the switch, and the power supply circuit can supply power to the first contact and the second contact. In addition, the first fixture includes a fixture latching a second light-emitting body adjacent to the first light-emitting body.

According to the above embodiment of the present invention, a lighting device whose mounting height is suppressed and in which light-emitting bodies can be arranged with no space therebetween and supported can be provided. When a plurality of planar light-emitting bodies is mounted on a supporting structural object (e.g., a ceiling or a wall), the distance between the first light-emitting body and the second light-emitting body which are adjacent to each other can be decided by a first fixture. Thus, a lighting device in which planar light-emitting bodies can be easily arranged in an orderly manner can be provided.

According to the present invention, a fixing device of a light-emitting body, whose mounting height is suppressed, is provided. Further, a lighting device whose mounting height is suppressed can be provided. Further, a lighting device whose mounting height is suppressed and in which fixtures supporting a light-emitting body are hidden from view can be provided. Furthermore, a lighting device whose mounting height is suppressed and in which light-emitting bodies can be arranged with no space therebetween and supported can be provided.

BRIEF DESCRIPTION OF THE DRAWINGS

FIGS. 2A to 2E show a lighting device according to an embodiment.

FIGS. 3A to 3E show a lighting device according to an embodiment.

DETAILED DESCRIPTION OF THE INVENTION

Figure 1A:
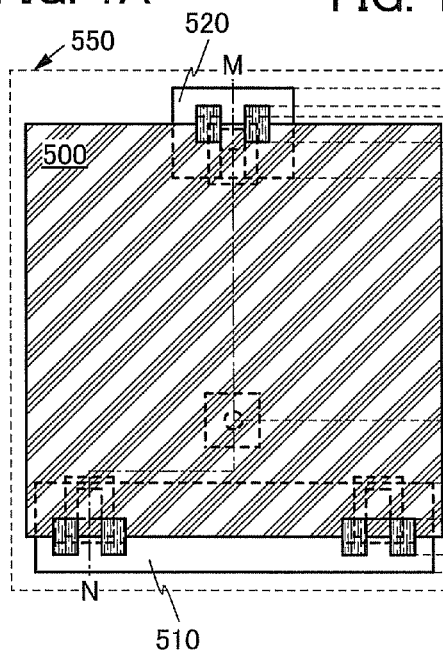
FIGS. 1A to 1F show a lighting device according to an embodiment.

Embodiments will be described with reference to the drawings. Note that the present invention is not limited to the following description, and it will be easily understood by those skilled in the art that various changes and modifications can be made without departing from the spirit and scope of the invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a structure will be described with reference to FIGS. 1A to 1F and FIGS. 2A to 2E. In the structure, a planar light-emitting body is formed using an organic electroluminescent element, a terminal is provided in each of end portions facing each other in the planar light-emitting body, the terminals are made in contact with contacts provided in fixtures, and the end portions of the light-emitting body are held between the fixtures.

Figure 1B:
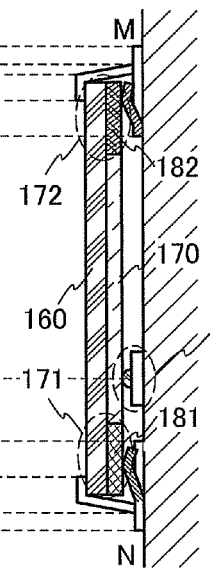

A lighting device described as an example in this embodiment is shown in FIGS. 1A to 1F. FIG. 1A is a top view from a light-emitting surface side of a lighting device 550 and FIG. 1B is a cross-sectional view along a line M-N.

The lighting device 550 includes a planar light-emitting body 500, a first fixture 510, a second fixture 520, a switch 530, and a power supply circuit (not shown).

The light-emitting body 500 includes an optical member 160 having a light-transmitting property and a sealing member 170, and an organic EL element (not shown) provided therebetween. Note that light emission of the organic EL element is extracted to the optical member 160 side. A first latch portion 171 and a second latch portion 172 are provided in end portions facing each other in the light-emitting body 500. The first latch portion 171 includes a first terminal 181 electrically connected to a first electrode of the organic EL element and the second latch portion 172 includes a second terminal 182 electrically connected to a second electrode of the organic EL element. By providing the first terminal 181 and the second terminal 182 in a surface other than a surface from which light from the optical member 160 is extracted, the whole surface of the light-emitting body can emit light.

Figure 1C:
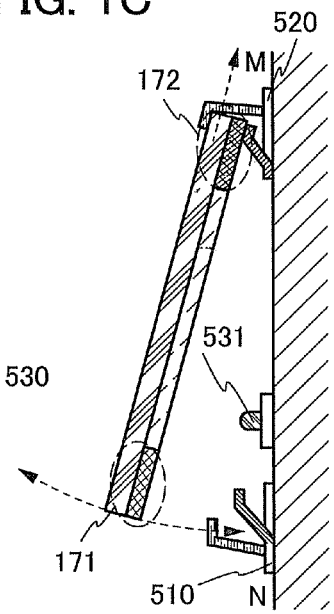
Figure 1D:
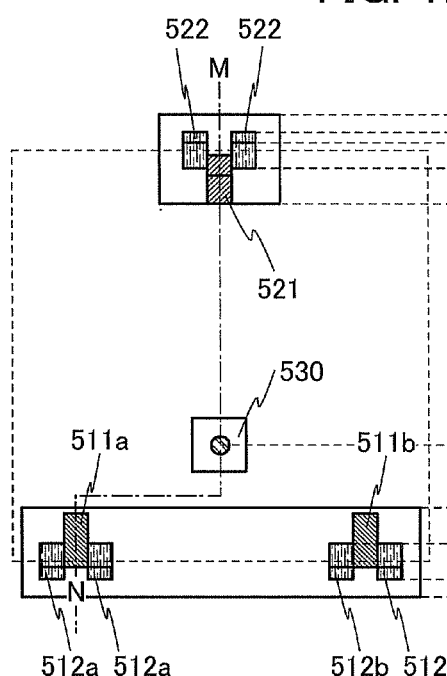
Figure 1E:
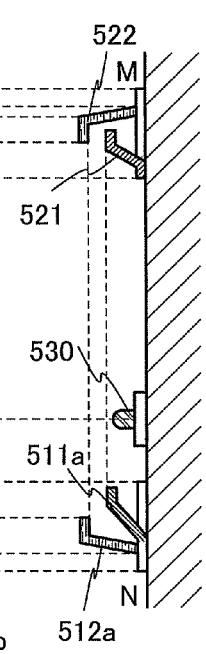
Figure 1F:
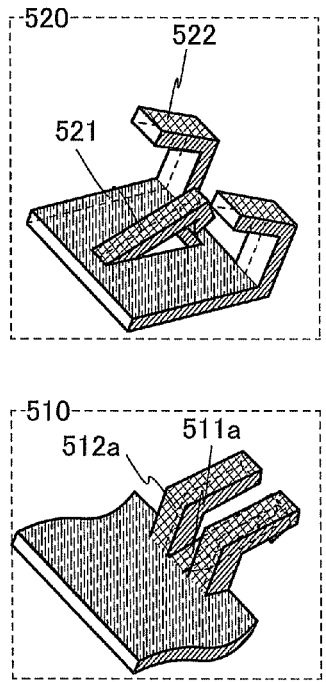

A structure of the first fixture 510 is described with reference to a top view of the lighting device 550 from which the light-emitting body 500 is removed (FIG. 1D) and a cross-sectional view along a line M-N in FIG. 1D (FIG. 1E). Perspective views partly showing the first fixture 510 and the second fixture 520 are shown in FIG. 1F. The first fixture 510 described as an example in this embodiment includes a contact 511a, hooks 512a, a contact 511b, and hooks 512b. The second fixture 520 includes a contact 521 and hooks 522.

The light-emitting body 500 is held between the hooks 512a and the hooks 522 and between the hooks 512b and the hooks 522. Ends of each of the hooks 512a, the hooks 512b, and the hooks 522, which are described as an example in this embodiment have hook shapes and include elastic bodies. As an elastic body, a flat spring or the like can be used, for example. Since the hooks 512a, the hooks 512b, and the hooks 522 each include an elastic body, the end portions of the light-emitting body can be held between the fixtures and the light-emitting body can be easily attached and detached to/from the fixtures. The latch portions provided in the end portions of the light-emitting body are held between the first fixture and the second fixture, whereby the height of the lighting device is suppressed by the latch portions, which leads to an effect of suppressing the mounting height. The latch portion is provided on a side surface of the light-emitting body in the lighting device described as an example in this embodiment, so that the height of the light-emitting body is not increased by the latch portion. Moreover, since the light-emitting body is held between the first fixture and the second fixture, a protrusion of the light-emitting body is prevented. Note that the shapes of the hooks 512a, the hooks 512b, and the hooks 522 are not limited to a hook shape as long as the hooks 512a, the hooks 512b, and the hooks 522 can support the light-emitting body 500 to attach and detach to/from the fixtures.

The contact 511a, the contact 511b, and the contact 521 are electrically connected to terminals provided in the light-emitting body 500. In the lighting device described as an example in this embodiment, the contact 511a and the contact 511b are connected to the first terminal 181, and the contact 521 is connected to the second terminal 182. The contact 511a, the contact 511b, and the contact 521 each include a flat spring having electrical conductivity. Since the contacts are each formed using an elastic body having electrical conductivity, the contacts can be electrically connected to the terminals of the light-emitting body surely and easily.

The reason why the switch 530 is provided in a position overlapping with the light-emitting body 500 will be described with reference to FIG. 1C. First, the second latch portion 172 is latched to the second fixture 520 so that the second contact 521 provided in the second fixture 520 is electrically connected to the second terminal 182 in the light-emitting body 500. Next, the first latch portion 171 is moved to the first fixture 510 in a circular motion while the light-emitting body 500 is pressed on the second fixture 520, so that the light-emitting body 500 can be held between the first fixture 510 and the second fixture 520 as shown in FIG. 1B.

When the switch 530 is provided in a position overlapping with the light-emitting body 500, a detector 531 can detect that the light-emitting body 500 is correctly mounted. The switch 530 described as an example in this embodiment is a contact type switch. The detector 531 in the switch 530, which is provided in a position overlapping with the light-emitting body 500, is pushed when the light-emitting body 500 is mounted, whereby the switch 530 turns on.

Note that the light-emitting body held between the first fixture and the second fixture turns on the switch, whereby power can be supplied from the power supply circuit to a first contact included in the first fixture and a second contact included in the second fixture. With such a structure, a short circuit between the first contact and the second contact can be prevented in the state where the light-emitting body is not mounted.

Modification Example

A modification example of the lighting device described as an example in this embodiment is shown in FIGS. 2A to 2E. Specifically, a lighting device in which a first latch portion and a second latch portion are included in a back surface of a light-emitting body on a side where light is extracted, and a first fixture and a second fixture are provided in a position overlapping with a light-emitting body will be described.

A lighting device 650 can be formed using fixtures, a switch, and a power supply circuit, which are similar to those of the lighting device 550, except a light-emitting body 600. Therefore, description of the lighting device 550 can be referred to for the details of portions having a structure similar to that of the lighting device 550.

The light-emitting body 600 includes an optical member 260 having a light-transmitting property, a sealing member 270, and an organic EL element (not shown) provided therebetween. Note that light emission of the organic EL element is extracted to the optical member 260 side. The sealing member 270 includes end portions facing each other positioned inside the rim of the optical member 260, that is, positioned to overlap with the optical member 260. In the end portions facing each other, a first latch portion 271 and a second latch portion 272 are provided. The first latch portion 271 includes a first terminal 281 electrically connected to a first electrode of the organic EL element and the second latch portion 272 includes a second terminal 282 electrically connected to a second electrode of the organic EL element.

By providing the latch portions in positions over lapping with the optical member, the latch portions are not seen from the optical member side, which leads to an improvement of the appearance. Further, the latch portions do not block light emitted from the organic EL element through the optical member, whereby an effective area of the lighting device can be increased.

The structure in which a planar light-emitting body whose thickness is suppressed is formed using an organic electroluminescent element, a terminal is provided in each of end portions facing each other in the planar light-emitting body, the terminals are made in contact with contacts provided in a fixture, and the end portions of the light-emitting body are held between the fixtures is described as an example in this embodiment. With this structure, a lighting device whose mounting height is suppressed can be provided. Further, a lighting device whose mounting height is suppressed and in which fixtures supporting a light-emitting body are hidden from view can be provided. Furthermore, a lighting device whose mounting height is suppressed and in which light-emitting bodies can be arranged with no space therebetween and supported can be provided.

This embodiment can be freely combined with any of the other embodiments in this specification.

Embodiment 2

In this embodiment, an embodiment of a lighting device which is different from that in Embodiment 1 will be described with reference to FIGS. 3A to 3E. For the light-emitting device, a structure in which a planar light-emitting body whose thickness is suppressed is formed using an organic electroluminescent element, a terminal is provided in each of end portions facing each other in the planar light-emitting body, the terminals are made in contact with contacts provided in fixtures, and the end portions of the light-emitting body are held between the fixtures is used. Specifically, a lighting device including fixtures to which a first latch portion of a first light-emitting body and a second latch portion of a second light-emitting body adjacent to the first light-emitting body are latched will be described.

FIGS. 3A to 3E show a lighting device described as an example in this embodiment. FIG. 3A is a top view from a light-emitting surface side of a lighting device 750 and FIG. 3B is a cross-sectional view along a line M-N.

The lighting device 750 includes a first planar light-emitting body 600a, a first fixture 710, a second fixture 720, a switch 730, and a power supply circuit (not shown) (see FIGS. 3A and 3D). Note that the other lighting device is provided adjacent to the lighting device 750 described as an example in this embodiment. Part of a planar light-emitting body 600b included in the other lighting device adjacent to the lighting device 750 is shown in FIGS. 3A, 3B, and 3C.

The lighting device 750 can be formed using a light-emitting body, a switch, and a power supply circuit, which are similar to those of the lighting device 650 described in Embodiment 1, except fixtures. Therefore, description of the lighting device 650 can be referred to for the details of portions having a structure similar to that of the lighting device 650.

A structure of the first fixture 710 and a structure of the second fixture 720, which are included in the lighting device 750, will be described with reference to a top view (FIG. 3D) and a cross-sectional view (FIG. 3E) along a line M-N in FIG. 3D. Note that in the top view (FIG. 3D), the first light-emitting body 600a and the second light-emitting body 600b are removed from the lighting device 750 and the lighting device adjacent to the lighting device 750, respectively.

The fixture 710 described as an example in this embodiment includes a contact 711a, hooks 712a, a contact 711b, hooks 712b, a contact 713, and hooks 714. The fixture 720 described as an example in this embodiment includes a contact 721a, hooks 722a, a contact 721b, hooks 722b, a contact 723, and hooks 724. Note that in this embodiment, the case where the fixture 710 and the fixture 720 have the same structure will be described.

The first light-emitting body 600a is held between the hooks 712a and the hooks 724 and between the hooks 712b and the hooks 724. Ends of each of the hooks 712a, the hooks 712b, and the hooks 724, which are described as an example in this embodiment have hook shapes and include flat springs. Since the hooks 712a, the hooks 712b, and the hooks 724 each include an elastic body, the light-emitting body can be easily attached and detached to/from the fixture. Note that the shape of the hooks 712a, the hooks 712b, and the hooks 724 is not limited to a hook shape as long as the hooks 712a, the hooks 712b, and the hooks 724 can support the first light-emitting body 600a to attach and detach to/from the fixtures.

In the fixture 710, the back of the hooks 714 faces the back of the hooks 712a and the back of the hooks 712b. By providing the hooks 714, the hooks 712a, and the hooks 712b in the first fixture 710 in such a position, the first fixture 710 can support latch portions provided in adjacent end portions of the two light-emitting bodies. Consequently, in the first fixture 710, the distance between the two light-emitting bodies adjacent to each other can be decided with the use of a distance between the hooks facing each other.

The contact 711a, the contact 711b, and the contact 723 are electrically connected to terminals provided in the first light-emitting body 600a. In the lighting device 750 described as an example in this embodiment, the contact 711a and the contact 711b are connected to the first terminal 281 in the first light-emitting body 600a, and the contact 723 is connected to the second terminal 282 in the first light-emitting body 600a. In addition, the contact 711a, the contact 711b, and the contact 723 each include a flat spring having electrical conductivity. Since the contacts are each formed using an elastic body having electrical conductivity, the contacts can be electrically connected to the terminals of the light-emitting body surely and easily.

According to the above embodiment of the present invention, a lighting device whose mounting height is suppressed and in which light-emitting bodies can be arranged with no space therebetween and supported can be provided. When a plurality of planar light-emitting bodies is mounted on a supporting structural object (e.g., a ceiling or a wall), the distance between the first light-emitting body and the second light-emitting body which are adjacent to each other can be decided by a fixture. Thus, a lighting device in which planar light-emitting bodies can be easily arranged in an orderly manner can be provided.

Modification Example

Figure 4:
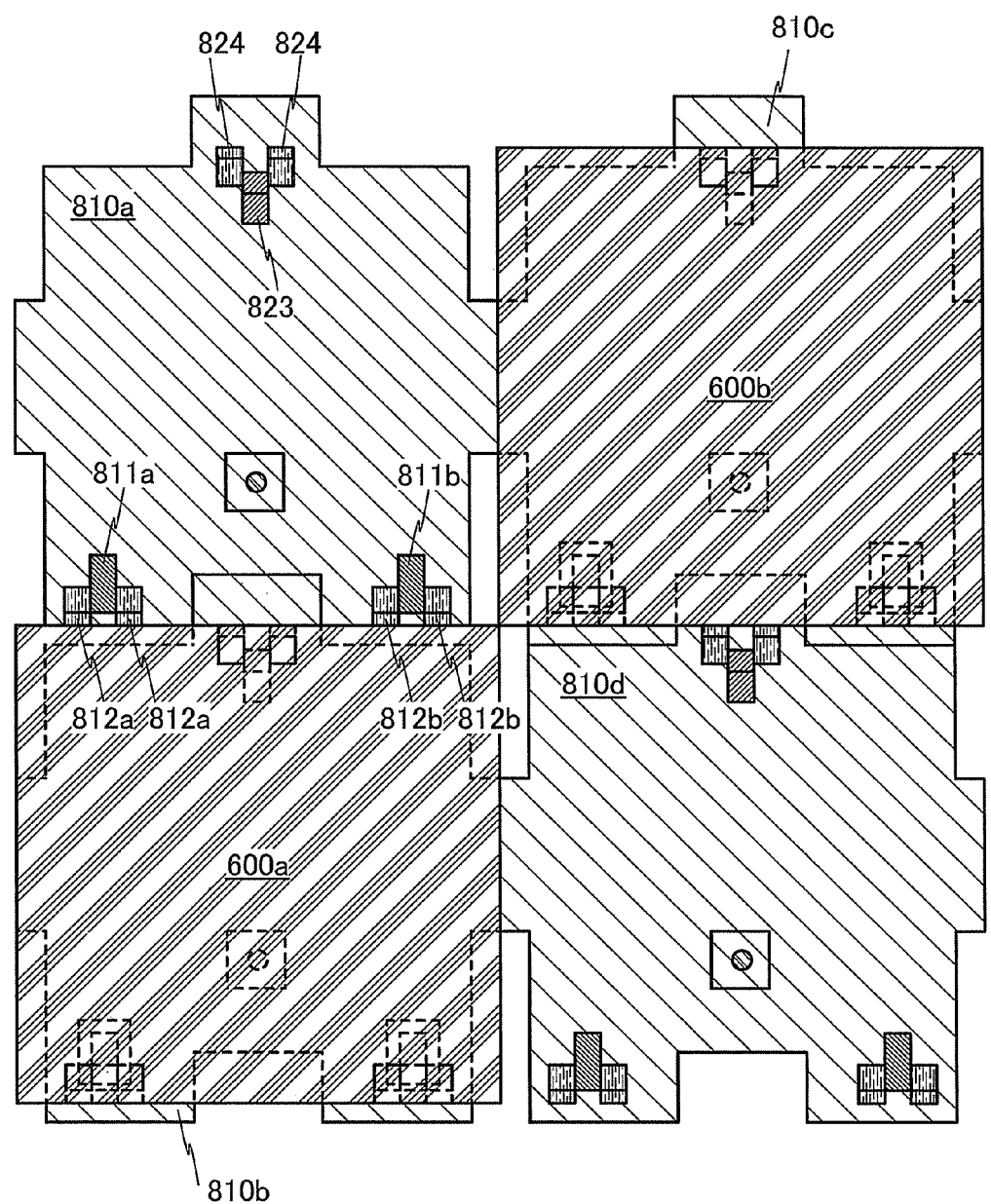
FIG. 4 shows fixtures of a lighting device according to an embodiment.

A modification example of the lighting device described as an example in this embodiment will be described with reference to FIG. 4. Specifically, a lighting device including the first fixture and the second fixture as one fixture with a distance which is the same as a distance between the first latch portion and the second latch portion will be described.

The modification example described in this embodiment can be formed using a planar light-emitting body, a switch, and a power supply circuit, which are similar to those of the lighting device 750, except fixtures. Therefore, description of the lighting device 750 can be referred to for the details of portions having a structure similar to that of the lighting device 750.

Structures of the fixtures will be described with reference to a top view in FIG. 4. Note that in FIG. 4, a fixture 810a, a fixture 810b, a fixture 810c, and a fixture 810d, each having the same structure are arranged and in contact with each other. The fixture 810b in the bottom left of the view and the fixture 810c in top right of the view support the first light-emitting body 600a and the second light-emitting body 600b, respectively.

The fixture 810a includes a contact 811a, hooks 812a, a contact 811b, hooks 812b, a contact 823, and hooks 824.

A light-emitting body is held between the hooks 812a and the hooks 824 and between the hooks 812b and the hooks 824. The hooks included in the fixture 810a can have structures similar to those in the lighting device 750. Therefore, description of the lighting device 750 can be referred to for the details of portions having a structure similar to that of the lighting device 750.

Note that in the fixture 810a, the hooks 824 are provided to face the hooks 812a and the hooks 812b. The hooks 812a and the hooks 812b are provided apart from the hooks 824 in order to latch a light-emitting body between the hooks 824. By providing the hooks 812a, the hooks 812b, and the hooks 824 in the fixture 810a in such a position, the fixture 810a can support a light-emitting body.

When seen from the outside, the fixture 810a described as an example in this embodiment is in contact with the adjacent fixture. With such an outside shape, a distance, with which the light-emitting body supported by the fixture 810c does not interfere with a light-emitting body supported by the adjacent fixture, can be kept. With such an outside shape, a lighting device in which planar light-emitting bodies can be easily arranged in an orderly manner can be provided.

This embodiment can be freely combined with any of the other embodiments in this specification.

Embodiment 3

In this embodiment, a lighting device, in which a switch detects that a light-emitting body is correctly mounted, and power can be supplied to contacts in a fixture, will be described with reference to FIG. 5.

A structure of the lighting device described as an example in this embodiment will be described with reference to FIG. 5. FIG. 5 shows a top view of fixtures in a lighting device having a structure in which a first latch portion and a second latch portion in a light-emitting body are latched by one fixture, which is described as an example in Embodiment 2; power supply circuits; and wirings connecting to contacts provided in the fixtures.

Specifically, a top view of the fixture 810a, the fixture 810b, the fixture 810c, and the fixture 810d in the lighting device are shown. The fixture 810a, the fixture 810b, the fixture 810c, and the fixture 810d include a switch 830a, a switch 830b, a switch 830c, and a switch 830d, respectively. Each of the fixtures includes the contact 811a, the contact 811b, the contact 823, and a light-emitting body.

The light-emitting body fixed to the fixture 810a includes a light-emitting element 620a and a DCDC converter 630a. The light-emitting body fixed to the fixture 810b includes a light-emitting element 620b and a DCDC converter 630b. The light-emitting body fixed to the fixture 810c includes a light-emitting element 620c, and the light-emitting body fixed to the fixture 810d includes a light-emitting element 620d.

A constant voltage supply 901 supplies power to the fixture 810a and the fixture 810b, and a constant current supply 902 supplies power to the fixture 810c and the fixture 810d.

Next, the wirings connecting to the power supplies, the contacts provided in the fixtures, and the switches provided in the fixtures will be described. Note that the fixture 810a and the fixture 810b shown in the left side of FIG. 5 each have a structure different from those of the fixture 810c and the fixture 810d shown in the right side of FIG. 5; therefore, each description is made separately.

Figure 5:
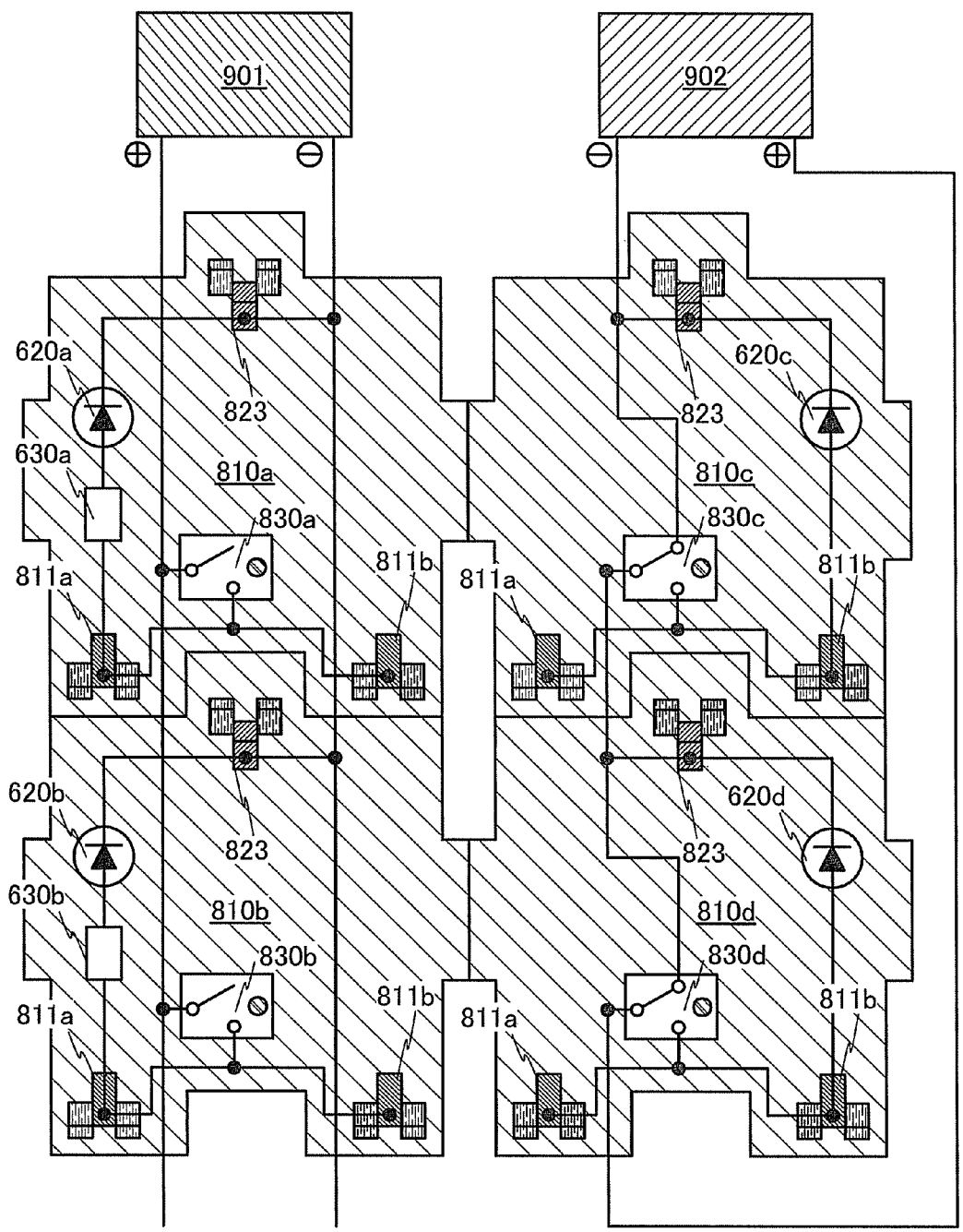
FIG. 5 shows connections of a lighting device according to an embodiment.

The contacts provided in the fixture 810a and the fixture 810b shown in the left side of FIG. 5 are connected to the constant voltage supply 901 in parallel, and the fixture 810a and the fixture 810b are equivalent to the constant voltage supply 901. Therefore, a connection relation of only the fixture 810a is described and the description of the connection relation of the fixture 810a is referred to for the description of a connection relation of the fixture 810b.

A first power supply potential is supplied from the constant voltage supply 901 to a first terminal of the switch 830a. A second terminal of the switch 830a is connected to the contacts 811a and 811b. The contacts 811a and 811b are connected to a first terminal of the DCDC converter 630a provided in the light-emitting body through a first terminal (not shown) of the light-emitting body. A second terminal of the DCDC converter 630a is connected to a first electrode of the light-emitting element 620a. A second power supply potential is supplied from the constant voltage supply 901 to a second electrode of the light-emitting element 620a through the contact 823.

The switch 830a detects that the light-emitting body is correctly mounted on the fixture 810a, and the constant voltage supply 901 connected to the first terminal is connected to the second terminal. Note that the structure of the switch 830a is not particularly limited. For example, a contact type switch can be used. In that case, when the light-emitting body is mounted, the light-emitting body pushes the switch, whereby whether the light-emitting body is held or not can be detected.

Further, the light-emitting body described as an example in this embodiment includes a DCDC converter suitable for the specifications of a light-emitting element. By including the DCDC converter on the light-emitting body side, a problem of flow of overcurrent to the light-emitting element can be prevented even in the case where light-emitting elements with different driving voltages are included in the light-emitting bodies. Thus, the light-emitting body can be freely replaced with a light-emitting body with desired specifications without any change in an output voltage of the constant voltage supply.

Note that the DCDC converter may be provided on the fixture side not on the light-emitting body side. For example, the DCDC converter can be connected between the switch 830a and the contact 811a and between the switch 830a and the contact 811b. With a structure in which the DCDC converter is provided in the fixture side, the cost of manufacturing the light-emitting body that is a consumable product can be reduced.

With such a structure and connections, a lighting device, in which a switch detects that a light-emitting body is correctly mounted, and power can be supplied to contacts in a fixture, can be provided.

The contacts provided in the fixture 810c and the fixture 810d shown in the right side of FIG. 5 are connected to the constant current supply 902 in series.

One output terminal of the constant current supply 902 is connected to a first terminal of the switch 830d provided in the fixture 810d and a constant current is supplied to the first terminal. A second terminal of the switch 830d is connected to the contacts 811a and 811b provided in the fixture 810d, and a third terminal of the switch 830d is connected to a first terminal of the switch 830c provided in the fixture 810c.

The contacts 811a and 811b provided in the fixture 810d are connected to a first terminal of the light-emitting element 620d included in the light-emitting body. A second terminal of the light-emitting element 620d is connected to the first terminal of the switch 830c provided in the fixture 810c through the contact 823 provided in the fixture 810d.

A second terminal of the switch 830c provided in the fixture 810c is connected to the contacts 811a and 811b provided in the fixture 810c, and a third terminal of the switch 830c is connected to the other output terminal of the constant current supply 902.

The contacts 811a and 811b provided in the fixture 810c are connected to a first terminal of the light-emitting element 620c included in the light-emitting body. A second terminal of the light-emitting element 620c is connected to the other output terminal of the constant current supply 902 through the contact 823 provided in the fixture 810c.

The switch 830c detects a state in which the light-emitting body is correctly mounted on the fixture 810c, and the first terminal of the switch 830c is connected to the second terminal of the switch 830c. In a state other than the above, the first terminal of the switch 830c is connected to the third terminal of the switch 830c. The switch 830d detects a state in which the light-emitting body is correctly mounted on the fixture 810d, and the first terminal of the switch 830d is connected to the second terminal of the switch 830d. In a state other than the above, the first terminal of the switch 830d is connected to the third terminal of the switch 830d.

Note that for the switch 830c and the switch 830d, a switch, which detects that a light-emitting body is correctly mounted and in which a second terminal or a third terminal is connected to a first terminal, is used. For example, a structure can be employed in which a contact type switch is pushed by a light-emitting body when a light-emitting body is mounted, whereby whether the light-emitting body is held or not is detected. Alternatively, a relay can be used.

With such a structure and connections, a lighting device, in which a switch detects that a light-emitting body is correctly mounted and power can be supplied to contacts in a fixture, can be provided.

When light-emitting bodies, each including an organic EL element as a light-emitting element, are connected to the constant current supply 902 in series, the light-emitting bodies connected in series can emit light at substantially the same luminance. This is because the luminance of an organic EL element is roughly controlled by a driving current. In the case of using a plurality of lighting devices which are arranged, the lighting devices emit light at the same luminance, so that uniform luminance can be achieved, which is preferable.

With such a structure and connections, a bypass circuit can be provided for each of a plurality of light-emitting bodies connected in series. There is a problem in that when one of a plurality of light-emitting bodies connected in series is out of order and the conductivity is lost, a current does not flow to all of the other light-emitting bodies connected in series. However, by providing a bypass circuit for each of the plurality of light-emitting bodies connected in series, the other light-emitting bodies can be connected in series while the light-emitting body losing conductivity is bypassed; therefore, a constant current can be supplied to a light-emitting body with no problem and the lighting device can be operated.

For example, in the lighting device described as an example in this embodiment, when the light-emitting element 620c loses conductivity, a current does not flow to the light-emitting element 620d connected in series to the light-emitting element 620c. However, by removing the light-emitting element 620c with a problem and connecting the first terminal of the switch 830c to the third terminal of the switch 830c, a current can be flown to the light-emitting element 620d through a bypass circuit.

Modification Example

As a modification example of the lighting device described as an example in this embodiment, a lighting device having a structure in which a relay is used as a switch, a sensor observing an operation state of a light-emitting element in the lighting device is provided, and the relay is operated depending on a signal of the sensor can be given.

For example, in the case where a sensor detecting temperature of the light-emitting element is provided in the lighting device, and the temperature of the light-emitting element is determined as unusual, a signal is input to the relay to switch connection from the light-emitting body to a bypass circuit, and power supply to the light-emitting body can be stopped. Such a structure prevents lights of all of the light-emitting bodies connected in series from being turned off due to one light-emitting element with a problem. In addition, only light of a light-emitting body including the light-emitting element with a problem turns off, so that a user can visually identify the light-emitting body, and the light-emitting body can be easily exchanged.

The sensor detecting an operation state of a light-emitting element is not limited to a temperature sensor, and a photosensor detecting unusual brightness, a potentiometer detecting an unusual voltage between terminals of a light-emitting element, or the like can be used.

The structure in which a planar light-emitting body whose thickness is suppressed is formed using an organic electroluminescent element, a terminal is provided in each of end portions facing each other in the planar light-emitting body, the terminals are made in contact with contacts provided in a fixture, and the end portions of the light-emitting body are held by the fixture is described as an example in this embodiment. With this structure, a lighting device whose mounting height is suppressed can be provided. Further, a lighting device whose mounting height is suppressed and in which a fixture supporting a light-emitting body is hidden from view can be provided. Furthermore, a lighting device whose mounting height is suppressed and in which light-emitting bodies can be arranged with no space therebetween and supported can be provided.

This embodiment can be freely combined with any of the other embodiments in this specification.

Embodiment 4

In this embodiment, a structure of a planar light-emitting body whose thickness is suppressed and which uses an organic electroluminescent element and can be used in Embodiments 1 to 3, will be described with reference to FIG. 6. Specifically, a light-emitting body including an optical member, an organic EL element, a drying agent, a first sealing member, a DCDC converter, a second sealing member, a first latch portion, a second latch portion, a first terminal, and a second terminal will be described.

Figure 6:
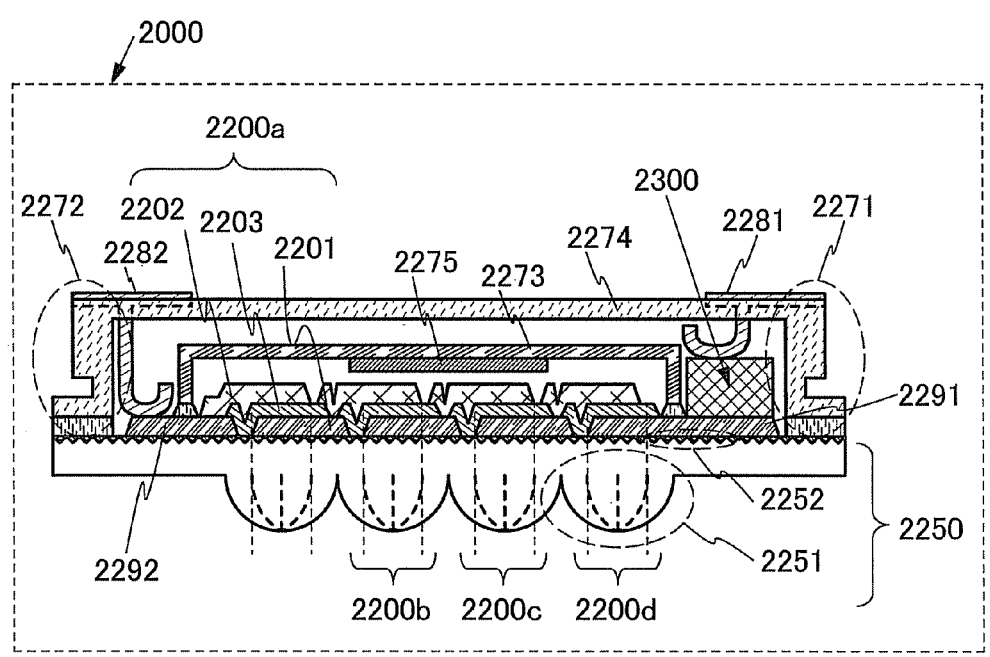
FIG. 6 shows a structure of a light-emitting body according to an embodiment.

FIG. 6 shows a cross-sectional view of a light-emitting body 2000 described as an example in this embodiment.

The light-emitting body 2000 includes an optical member 2250, an organic EL element 2200a, an organic EL element 2200b, an organic EL element 2200c, an organic EL element 2200d, a first sealing member 2273, and a second sealing member 2274.

The optical member 2250 has a light-transmitting property. A hemispherical structure body 2251 is formed on one surface of the optical member 2550, and an uneven structure 2252 is formed on the other surface. The optical member 2250 can be manufactured by shaping or bonding a plastic, glass, or the like and is formed using a material with a refractive index (e.g., with a refractive index greater than or equal to 1 and less than 1.6), which is relatively easily obtained at low cost.

With the hemispherical structure provided in the one surface, efficiency of extracting light from the light-emitting element to the air can be increased. In particular, a planarized structure in which a material with a high refractive index (e.g., a resin or the like with a refractive index greater than or equal to 1.6 and less than or equal to 2.1) is applied to the unevenness provided on the other surface is preferable. By filling the unevenness with the resin with a high refractive index, a structure body with a high refractive index is formed on the other surface, which is in contact with the light-emitting element, resulting in an increase in the efficiency of extracting light.

Note that a barrier film having a high refractive index (e.g., a refractive index greater than or equal to 1.6 and less than or equal to 2.1) and transmitting light emitted from the light-emitting element is preferably provided at the interface between the optical member. 2250 and the light-emitting element. An inorganic material such as a silicon nitride film is preferably used as the barrier film. By providing the barrier film, diffusion of an impurity to the light-emitting element can be prevented and the decrease in reliability can be prevented.

In the organic EL element 2200a, a layer 2203 containing an organic compound with a light-emitting property is provided between a first electrode 2201 and a second electrode 2202. In this embodiment, the first electrode 2201 includes a conductive film (e.g., indium tin oxide (ITO)) transmitting light emitted from the organic EL element itself, and the second electrode 2202 includes a conductive film (e.g., aluminum) reflecting light emitted from the organic EL element itself.

Note that the organic EL element 2200b, the organic EL element 2200c, and the organic EL element 2200d have the same structure as that of the organic EL element 2200a; therefore, description of the organic EL element 2200a can be referred to.

Note that the organic EL elements of this embodiment are connected in series. Specifically, the first electrode of the organic EL element 2200a is connected to a second electrode of the organic EL element 2200b. A first electrode of the organic EL element 2200b is connected to a second electrode of the organic EL element 2200c. A first electrode of the organic EL element 2200c is connected to a second electrode of the organic EL element 2200d. With such a structure, a driving voltage of the light-emitting body can be increased.

In general, an alternating current of about 100 V is supplied from a lamp line as a voltage. On the other hand, an organic EL element operates at a direct current of about 3 V to 5 V. When a difference between a voltage supplied from a lamp line to a converter and a driving voltage of an organic EL element connected to the converter as a load is large, there is a problem of the decrease in the power conversion efficiency of the converter.

The light-emitting body 2000 described as an example in this embodiment includes a plurality of organic EL elements and the organic EL elements are connected in series in order to obtain a driving voltage that can be efficiently converted by converter. With such a structure, the power conversion efficiency of the converter is increased and power consumption can be reduced. Note that a driving voltage can be adjusted as appropriate by changing the number of organic EL elements connected in series. Further, a range where the power conversion efficiency of a converter is well is specifically the output voltage of about greater than or equal to 12 V and less than or equal to 50 V.

The first sealing member 2273 has a barrier property to moisture or the like, and by sealing an organic EL element with a dry agent 2275, the organic EL element is protected from the air. Glass or a metal lid can be used as the first sealing member 2273.

Note that a first electrode of the organic EL element 2200d is connected to a first extraction terminal 2291 extending the outside of the first sealing member 2273. A second electrode of the organic EL element 2200a is connected to a second extraction terminal 2292 extending the outside of the first sealing member 2273.

The light-emitting body described as an example in this embodiment includes a DCDC converter 2300 over the first extraction terminal 2291; however, the DCDC converter 2300 can be provided on a fixture side.

The second sealing member 2274 is a housing of the light-emitting body 2000, and a first latch portion 2271 and a second latch portion 2272 are included in end portions facing each other in the second sealing housing member 2274. The first latch portion 2271 includes a first terminal 2281 electrically connecting to a first extraction terminal 2291 through the DCDC converter 2300. The second latch portion 2272 includes a second terminal 2282 electrically connecting to a second extraction terminal 2292.

This application is based on Japanese Patent Application serial No. 2010-258861 filed with Japan Patent Office on Nov. 19, 2010, the entire contents of which are hereby incorporated by reference.

What is claimed is:

1. A fixing device of a light-emitting body comprising:
a first fixture including a first contact;
a second fixture including a second contact;
a power supply circuit; and
a switch designed to open or close in response to a state whether or not the light-emitting body is fixed to the fixing device,
wherein the first fixture and the second fixture are arranged to hold the light-emitting body therebetween, and
wherein the power supply circuit is configured to supply power for driving the light-emitting body to the first contact and the second contact through the switch.

2. The fixing device of a light-emitting body according to claim 1,
wherein a first latch portion and a second latch portion are included in a back surface of the light-emitting body on a side where light is extracted, and
wherein the first fixture and the second fixture are provided to overlap with the light-emitting body.

3. The fixing device of a light-emitting body according to claim 2, wherein the first fixture and the second fixture are included with a distance which is the same as a distance between the first latch portion and the second latch portion.

4. The fixing device of a light-emitting body according to claim 1, wherein the light-emitting body comprises an organic EL element.

5. The fixing device of a light-emitting body according to claim 1, wherein the first fixture and the second fixture have elasticity.

6. A lighting device comprising:
a light-emitting body having a planer shape;
a first fixture and a second fixture having elasticity and arranged to face each other;
a power supply circuit; and
a switch designed to open or close in response to a state whether or not the light emitting body is fixed to the fixing device,
wherein the light-emitting body comprises an organic EL element, a first latch portion, and a second latch portion,
wherein the organic EL element comprises a layer comprising an organic material with a light-emitting property between a first electrode and a second electrode, wherein the first latch portion comprises a first terminal electrically connected to the first electrode of the organic EL element,
wherein the second latch portion comprises a second terminal electrically connected to the second electrode of the organic EL element,
wherein the first latch portion is latched to the first fixture so that the first terminal is electrically connected to a first contact provided in the first fixture,
wherein the second latch portion is latched to the second fixture so that the second terminal is electrically connected to a second contact provided in the second fixture, and
wherein the power supply circuit is configured to supply power for driving the light-emitting body to the first contact and the second contact through the switch.

7. The lighting device according to claim 6,
wherein the first latch portion and the second latch portion are included in a back surface of the light-emitting body on a side where light is extracted, and
wherein the first fixture and the second fixture are provided to overlap with the light-emitting body.

8. The lighting device according to claim 6, wherein the first fixture and the second fixture are included with a distance which is the same as a distance between the first latch portion and the second latch portion.

9. A lighting device comprising:
a first light-emitting body having a planer shape;
a first fixture and a second fixture having elasticity and arranged to face each other;
a power supply circuit; and
a switch designed to open or close in response to a state whether or not the light emitting body is fixed to the fixing device,
wherein the first light-emitting body comprises an organic EL element, a first latch portion, and a second latch portion,
wherein the organic EL element comprises a layer comprising an organic material with a light-emitting property between a first electrode and a second electrode,
wherein the first latch portion comprises a first terminal electrically connected to the first electrode of the organic EL element,
wherein the second latch portion comprises a second terminal electrically connected to the second electrode of the organic EL element,
wherein the first latch portion is latched to the first fixture so that the first terminal is electrically connected to a first contact provided in the first fixture,
wherein the second latch portion is latched to the second fixture so that the second terminal is electrically connected to a second contact provided in the second fixture,
wherein, the power supply circuit is configured to supply power for driving the first light-emitting body to the first contact and the second contact through the switch, and
wherein the first fixture is integrated with a third fixture latching a latch portion of a second light-emitting body adjacent to the first light-emitting body.

10. The lighting device according to claim 9,
wherein the first latch portion and the second latch portion are included in a back surface of the first light-emitting body on a side where light is extracted, and
wherein the first fixture and the second fixture are provided to overlap with the first light-emitting body.

11. The lighting device according to claim 9, wherein the first fixture and the second fixture are included with a distance which is the same as a distance between the first latch portion and the second latch portion.

* * * * *